(12) United States Patent
Gundlagutta et al.

(10) Patent No.: US 12,388,826 B2
(45) Date of Patent: Aug. 12, 2025

(54) SYSTEM AND METHOD FOR ACCESSING FEDERATED OBJECT STORES

(71) Applicant: Nutanix, Inc., San Jose, CA (US)

(72) Inventors: Naveen Reddy Gundlagutta, Bangalore (IN); Satyendra Singh Naruka, Pune (IN); Sirvisetti Venkat Sri Sai Ram, Kakinada (IN)

(73) Assignee: Nutanix, Inc., San Jose, CA (US)

( * ) Notice: Subject to any disclaimer, the term of this patent is extended or adjusted under 35 U.S.C. 154(b) by 119 days.

(21) Appl. No.: 18/544,399

(22) Filed: Dec. 18, 2023

(65) Prior Publication Data
US 2025/0080538 A1    Mar. 6, 2025

(30) Foreign Application Priority Data

Aug. 29, 2023 (IN) .............................. 202341057789

(51) Int. Cl.
*H04L 9/40* (2022.01)
*G06F 16/955* (2019.01)

(52) U.S. Cl.
CPC .......... *H04L 63/10* (2013.01); *G06F 16/9566* (2019.01)

(58) Field of Classification Search
CPC .............................. H04L 63/10; G06F 16/9566
See application file for complete search history.

(56) References Cited

U.S. PATENT DOCUMENTS

| | | |
|---|---|---|
| 7,653,668 B1 * | 1/2010 | Shelat ................... G06F 16/184 707/610 |
| 8,549,518 B1 | 10/2013 | Aron et al. |
| 8,601,473 B1 | 12/2013 | Aron et al. |
| 8,850,130 B1 | 9/2014 | Aron et al. |
| 8,863,124 B1 | 10/2014 | Aron |
| 9,009,106 B1 | 4/2015 | Aron et al. |
| 9,069,708 B2 | 6/2015 | Gill et al. |
| 9,336,132 B1 | 5/2016 | Aron et al. |
| 9,652,265 B1 | 5/2017 | Narayanasamy et al. |
| 9,772,866 B1 | 9/2017 | Aron et al. |
| 12,216,549 B2 * | 2/2025 | Yadav ................. G06F 11/1469 |

(Continued)

OTHER PUBLICATIONS

Cano, Ignacio, et al. "Curator: Self-Managing Storage for Enterprise Clusters" (Mar. 27, 2017), from https://www.usenix.org/conference/nsdi17/.

(Continued)

*Primary Examiner* — Ghodrat Jamshidi
(74) *Attorney, Agent, or Firm* — Foley & Lardner LLP

(57) ABSTRACT

A system and method for implementing an objects browser is disclosed. The system and method include receiving a request through the objects browser of a first object store to perform an operation on either the first or a second object store. The first and second object stores are part of a federated namespace. The system and method further include making an API request to an objects server, determining whether the API request is to access the first object store or the second object store, and providing access to the first object store responsive to determining that the API request is to perform the operation on the first object store or route the API request to the second object store to perform the operation on the second object store responsive to determining that the API request is to perform the operation on the second object store.

18 Claims, 6 Drawing Sheets

(56) References Cited

U.S. PATENT DOCUMENTS

| | | | |
|---|---|---|---|
| 12,321,908 B2* | 6/2025 | Annamalai | G06Q 20/38215 |
| 2008/0154987 A1* | 6/2008 | Kottomtharayil | G06F 11/1448 |
| 2016/0292193 A1 | 10/2016 | Madanapalli et al. | |
| 2017/0277872 A1* | 9/2017 | Mercury | H04L 63/083 |
| 2017/0279614 A1* | 9/2017 | Mercury | H04L 63/083 |
| 2020/0151114 A1 | 5/2020 | Mchugh et al. | |
| 2021/0034760 A1* | 2/2021 | Banga | G06F 21/602 |
| 2021/0397611 A1* | 12/2021 | Boutros | G06F 16/9024 |
| 2022/0138279 A1* | 5/2022 | Lepeska | H04L 67/02 709/213 |
| 2022/0210129 A1* | 6/2022 | Brett | H04L 12/283 |
| 2022/0269418 A1 | 8/2022 | Black et al. | |

OTHER PUBLICATIONS

Google Cloud. "Bucket locations" Cloud Storage. Dec. 8, 2022. Retrieved from https://cloud.google.com/storage/docs/locations (accessed Oct. 13, 2023).

IBM. "Configuring the initial object store data sources by using the graphical user interface" FileNet P8 Platform. Dec. 16, 2022. Retrieved from https://www.ibm.com/docs/en/filenet-p8-platform/5.5.x?topic=ccpeibugui-configuring-initial-object-store-data-sources-by-using-graphical-user-interface (accessed Oct. 13, 2023).

IBM. "Creating the initial object store" FileNet P8 Platform. Dec. 16, 2022. Retrieved from https://www.ibm.com/docs/en/filenet-p8-platform/5.5.x?topic=engine-creating-initial-object-store (accessed Oct. 13, 2023).

IBM. "Federating content" FileNet P8 Platform. Feb. 9, 2023. Retrieved from https://www.ibm.com/docs/en/filenet-p8-platform/5.5.x?topic=infrastructure-federating-content (accessed Oct. 13, 2023).

IBM. "Getting started with IBM Cloud Object Storage" Product Guide Object Storage. Jan. 19, 2022. Retrieved from https://cloud.ibm.com/docs/cloud-object-storage?topic=cloud-object-storage-getting-started-cloud-object-storage (accessed Oct. 13, 2023).

IBM. "Request forwarding" FileNet P8 Platform. Feb. 9, 2023. Retrieved from https://www.ibm.com/docs/en/filenet-p8-platform/5.5.x?topic=infrastructure-request-forwarding (accessed Oct. 13, 2023).

Oracle. "Configure Object Storage cross-region replication for Disaster Recovery" Help Center. Oct. 12, 2022. Retrieved from https://docs.oracle.com/en/learn/object-replication-for-dr/index.html (accessed Oct. 13, 2023).

Oracle. "Object Storage" Oracle Cloud Infrastructure (OCI). Mar. 8, 2022. Retrieved from https://www.oracle.com/cloud/storage/object-storage/ (accessed Oct. 13, 2023).

Poitras, Steven. "The Nutanix Bible" (Jan. 11, 2014), from http://stevenpoitras.com/the-nutanix-bible/ (Publication date based on indicated capture date by Archive.org; first publication date unknown).

Poitras, Steven. "The Nutanix Bible" (Oct. 15, 2013), from http://stevenpoitras.com/the-nutanix-bible/ (Publication date based on indicated capture date by Archive.org; first publication date unknown).

Poitras, Steven. "The Nutanix Bible" (Sep. 17, 2019), from https://nutanixbible.com/.

Poitras, Steven. "The Nutanix Bible" (Jun. 20, 2014), from http://stevenpoitras.com/the-nutanix-bible/ (Publication date based on indicated capture date by Archive.org; first publication date unknown).

Poitras, Steven. "The Nutanix Bible" (Jan. 7, 2015), from http://stevenpoitras.com/the-nutanix-bible/ (Publication date based on indicated capture date by Archive.org; first publication date unknown).

Poitras, Steven. "The Nutanix Bible" (Jun. 9, 2015), from http://stevenpoitras.com/the-nutanix-bible/ (Publication date based on indicated capture date by Archive.org; first publication date unknown).

Red Hat. "Chapter 3. Configuring Quay before deployment" Red Hat Customer Portal. Mar. 24, 2023. Retrieved from https://access.redhat.com/documentation/en-us/red_hat_quay/3.6/html/deploy_red_hat_quay_on_openshift_with_the_quay_operator/operator-preconfigure (accessed Oct. 13, 2023).

Red Hat. "Chapter 6. Content distribution with Red Hat Quay" Red Hat Customer Portal. Aug. 18, 2023. Retrieved from https://access.redhat.com/documentation/en-us/red_hat_quay/3.9/html/red_hat_quay_architecture/content-distrib-intro (accessed Oct. 13, 2023).

Red Hat. "Chapter 9. Federated Object Gateway" Red Hat Customer Portal. Jul. 19, 2019. Retrieved from https://access.redhat.com/documentation/en-us/red_hat_ceph_storage/1.3/html/object_gateway_guide_for_red_hat_enterprise_linux/federated_object_gateway (accessed Oct. 13, 2023).

Red Hat. "Manage Red Hat Quay" Red Hat Customer Portal. Jul. 15, 2019. Retrieved from https://access.redhat.com/documentation/en-us/red_hat_quay/3/html-single/manage_red_hat_quay/index (accessed Oct. 13, 2023).

Red Hat. "Use Red Hat Quay" Red Hat Customer Portal. Jan. 19, 2022. Retrieved from https://access.redhat.com/documentation/en-us/red_hat_quay/3.5/html-single/use_red_hat_quay/index (accessed Oct. 13, 2023).

* cited by examiner

SYSTEM AND METHOD FOR ACCESSING FEDERATED OBJECT STORES

CROSS REFERENCE TO RELATED APPLICATIONS

The present application claims priority to India Application No.: 202341057789 filed on Aug. 29, 2023, the entirety of which is incorporated by reference herein.

BACKGROUND

Object storage treats data as discrete units, or objects, that are accompanied by metadata and a universally unique identifier (UUID). This unstructured data resides in a flat (as opposed to tiered) address space called a storage pool.

SUMMARY

Aspects of the present disclosure relate generally to object storage, and more particularly to a system and method for accessing federated object stores.

In some aspects, a system is disclosed. The system includes one or more memories having computer-readable instructions stored thereon and one or more processors of an objects browser that executes the computer-readable instructions to receive a request through the objects browser of a first object store to perform an operation on either the first object store or a second object store, wherein the request comprises a uniform resource locator (URL), wherein the first object store and the second object store are part of a federated namespace comprising a plurality of object stores, make an application programming interface (API) request to an objects server to access the first object store or the second object store, determine, by the objects server, whether the API request is to access the first object store or the second object store, and provide access, by the objects server, to the first object store responsive to determining that the API request is to perform the operation on the first object store or route the API request to the second object store to perform the operation on the second object store responsive to determining that the API request is to perform the operation on the second object store.

In some aspects, a non-transitory computer-readable media comprising computer-readable instructions stored thereon is disclosed. The computer-readable instructions when executed by one or more processors of an object browser cause the one or more processors to receive a request through the objects browser of a first object store to perform an operation on either the first object store or a second object store, wherein the request comprises a uniform resource locator (URL), wherein the first object store and the second object store are part of a federated namespace comprising a plurality of object stores, make an application programming interface (API) request to an objects server to access the first object store or the second object store, determine, by the objects server, whether the API request is to access the first object store or the second object store, and provide access, by the objects server, to the first object store responsive to determining that the API request is to perform the operation on the first object store or route the API request to the second object store to perform the operation on the second object store responsive to determining that the API request is to perform the operation on the second object store.

In some aspects, a method is disclosed. The method includes receiving, by one or more processors of an objects browser, a request through the objects browser of a first object store for performing an operation on either the first object store or a second object store, wherein the request comprises a uniform resource locator (URL), wherein the first object store and the second object store are part of a federated namespace comprising a plurality of object stores, making, by the one or more processors, an application programming interface (API) request to an objects server to access the first object store or the second object store, determining, by the objects server, whether the API request is to access the first object store or the second object store, and providing access, by the objects server, to the first object store responsive to determining that the API request is to perform the operation on the first object store or route the API request to the second object store to perform the operation on the second object store responsive to determining that the API request is to perform the operation on the second object store.

Further details of aspects, objects, and advantages of the disclosure are described below in the detailed description, drawings, and claims. Both the foregoing general description and the following detailed description are examples and are not intended to be limiting as to the scope of the disclosure. Particular embodiments may include all, some, or none of the components, elements, features, functions, operations, or steps of the embodiments disclosed above. The subject matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

Figure 1:
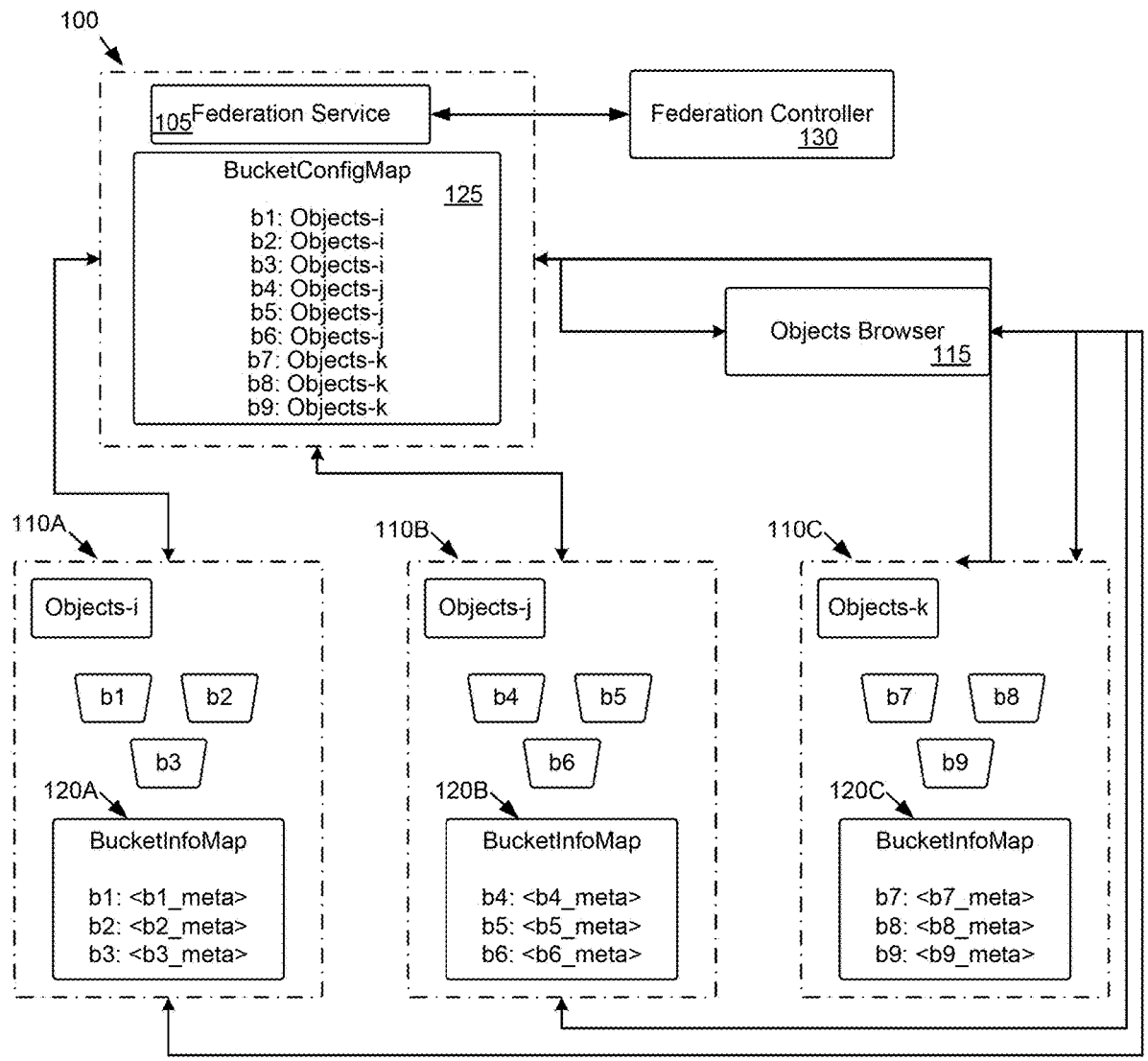
FIG. 1 is an example block diagram of a federated namespace having a federation service in communication with a plurality of object stores, as well as an objects browser for accessing the federation service and the plurality of object stores.

The foregoing and other features of the present disclosure will become apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings.

DETAILED DESCRIPTION

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and make part of this disclosure.

An object store is an architecture for managing large amounts of unstructured data. An object store may be part of a software defined object store service. In some implementations, the service may be designed with an Amazon Web Services (AWS) Simple Storage Service (AWS S3) compatible REST Application Programming Interface (API) capable of handling unstructured and machine-generated data. The service may be deployed and managed as part of an enterprise cloud system. The service may enable users to store and manage unstructured data on top of a highly scalable hyper converged platform. The service may provide a cloud-hosted solution or an on-premise hosted solution, or a combination thereof. An object store may be used for a variety of purposes. For example, an object store may be used for backup to protect data with a simple, scalable, and cost-effective active archive solution. The object store may be used for long-term retention of data, providing easy development access to data using simple API commands, etc.

An object store may include one or more buckets. Each bucket may be configured to store unstructured data. Each piece of data in a bucket may be called an object. The object store may be a single object store (also called a single object store instance) or be part of a federation. In the context of a single object store, a namespace is a set of unique buckets hosted by that object store instance. The federation (also called an object store federation) may include a plurality of object stores and may be associated with a federation namespace. A federation namespace (also referred to herein as federated namespace) may provide a way to create a single uniform namespace across a multiple individual object store instances. This single uniform namespace may allow multiple independent object stores to share a common namespace or naming system and to refer to the same resources (e.g., object store instances) using the same names, even if those resources are located in a different systems and locations. Thus, federation provides a way to create a single namespace across multiple individual object store instances and access the multiple individual object store instances using the single namespace.

Each object store may also have a default local namespace that is different and independent from the local namespaces of other object stores in the federated namespace. An object store may be part of multiple federated namespaces by becoming a member of each federation. Any object store that joins a federation as a member may contribute to the federated namespace. A federated namespace may be accessed from any member of the associated federation by using a federation fully qualified domain name (FQDN), for example, in a host field of an HTTP request. Federated namespaces may have the following properties: Federated namespace may enforce unique bucket names within the federated namespace. For example, if a user creates a bucket foo in a federated namespace, then another client that later tries creating the bucket foo would fail with error message BucketAlreadyExists or BucketAlreadyOwnedByYou. All users, irrespective of which federation member they choose to access the federated namespace from, see the same consistent list of buckets. Any buckets and objects that are part of the federated namespace may be accessed from any of the members of the federation.

All users, irrespective of which federation member they choose to access the federated namespace from, may see the same consistent list of buckets. Any buckets and objects that are part of the federated namespace may be accessed from any of the members. A federation is supported in the backend using a subset of the federation members, called Core Members. Core members, together, run a distributed consensus service in the backend to provide fault tolerance for the federated namespace.

Users may conduct bucket operations from any single point within a federation. A federation namespace may span across multiple object store instances that potentially reside in different geographical locations. Thus, the federation architecture allows scalability of object store services (both storage and compute) linearly across data centers, without any artificial limits on the number of instances in the federation. In some embodiments, objects or buckets may be reached with a single hop across a single object store instance. Subsequent accesses may avail cache entries to directly access the final destination of any objects or buckets. Global metadata service may be backed by a distributed consensus protocol to guarantee high availability across individual object store instance failures. The federation namespace may provide a mechanism to create and manage object stores on-premise, public cloud, private cloud, or combinations thereof, including moving objects between on-premises and cloud (whether private or public) and/or between one cloud (e.g., public cloud) and another cloud (e.g., private cloud). The federation namespace may be S3 compliant that uses S3 APIs for communication with the object store instances). The federation namespace may be considered a global namespace spanning multiple object stores allowing users to access the multiple object stores as a single unified namespace.

The federated namespace may be consumed/accessed using an objects browser. An objects browser may be a web-based user interface provided by the object store service to directly access and perform operations on any object store in a federation from any member (e.g., object store) of the federation by utilizing API requests. The objects browser may be launched from any member of the federation. When the objects browser is used to access the underlying object store (e.g., the object store on which the objects browser is launched), the access is considered "local" and when the objects browser is used to access another object store of the federation, the access is considered "remote." When used for local access, the objects browser may be used to perform operations only on the local object store (e.g., the object store on which the objects browser is launched). Conventionally, even if a particular object store is part of a federation, each object store may only be accessed using the objects browser launched thereon. This is inconvenient, complex, and requires the user to know the local namespaces of each object store that is part of the federation.

The present disclosure provides an objects browser that may be used for local access and remote access within the federation. In particular, the present disclosure provides access to the federated namespace by using any of the locally deployed object store instances. By providing both local access and global access, the objects browser of the present disclosure improves user experience, simplifies access the underlying storage using a web user interface, and makes efficient use of resources. The user interface may list all the buckets in the entire federation namespace even if they belong to different member object store instances. All the bucket and object level operations may be performed by the same user interface.

FIG. 1 is an example block diagram of a federation 100. The federation 100 may be part of, or form, a federated namespace. A federation may be considered a group of object store instances (also referred to herein as simply object stores) that presents (e.g., to a user) a unified object store service, including a global state and application programming interface (API). The federation 100 may include a federation service 105 in communication with object stores 110A, 110B, and 110C, which may be referred to as Objects-i, Objects-j, and Objects-k, respectively. The object stores 110A-110C are collectively referred to herein as "object stores 110." Although three object stores are shown in FIG. 1, in other embodiments, greater than or fewer than three object stores may be in communication with the federation service 105. The federation service 105 may be used to provide a global access to each of the object stores 110 using an objects browser 115.

The objects browser 115 may provide a user interface (e.g., a web based user interface) that allows a user to directly launch an object store in a web browser using a Uniform Resource Locator (URL) and perform bucket and object level operations. Using the objects browser, additional steps of logging in to access an object service may be avoided. A user may be able to launch the objects browser 115 from any of the object stores 110. For example, when an object store is created in the federation 100, an objects browser (e.g., the objects browser 115) is created for the newly created object store. Using the objects browser 115, the user may access the underlying object store (e.g., the object store from which the objects browser is being launched) and any other object store in the federation 100 regardless of the location of the object store. The underlying object store is referred to herein as a local object store, while the other object stores that may be accessed from the underlying object store are referred to herein as remote object stores. Each of the object stores 110 is a "member" of the federation 100.

Each of the object stores 110 is a logical or physical construct for storing objects (e.g., immutable data, unstructured data, etc.). Each of the object stores 110 may be hosted on a different host (e.g., node, host machine, physical host machine, server, server machine, etc.). For example, the object store 110A may be hosted on a first host, the object store 110B may be hosted on a second host, and the object store 110C may be hosted on a third host. In some embodiments, multiple object stores may be hosted on a single host. Each of the object stores 110 may include one or more buckets. For example, the object store 110A is shown to include buckets b1, b2, and b3, the object store 110B is shown to include buckets b4, b5, and b6, and the object store 110C is shown to include buckets b7, b8, and b9. Although three buckets are shown in each object store, each object store may include greater than or fewer than three buckets without departing from the scope of the present disclosure.

Bucket operations may include, but are not limited to, listing of buckets and objects, viewing and updating bucket, and/or object parameters (versioning, write-once-read-only (WORM), lifecycle, replication, etc.).

Each of the buckets include objects. Objects are discrete units of data that are stored in a structurally flat data environment. There may not be folders, directories, or complex hierarchies as in a file-based system. Each object may be a self-contained repository that includes the data, metadata (descriptive information associated with an object), and a unique identifying ID number (instead of a file name and file path). An object may be immutable data.

Each of the object stores 110 may include one or more namespaces. Namespace may include buckets and then objects within those buckets. Making the namespace global means making the buckets globally visible. Once buckets are globally accessible, bucket metadata may act as a link to make objects within those buckets globally accessible.

In some embodiments, each of the object stores 110 includes a mapping that maps the buckets in the respective object store to the bucket metadata of the respective buckets. For example, the object store 110A includes a mapping 120A, the object store 110B includes a mapping 120B, and the object store 110C includes a mapping 120C (collectively called the mappings 120). The mapping 120A maps the bucket b1 to the metadata of bucket b1, the bucket b2 to the metadata of bucket b2, and the bucket b3 to the metadata of bucket b3. The mapping 120B maps the bucket b4 to the metadata of bucket b4, the bucket b5 to the metadata of bucket b5, and the bucket b6 to the metadata of bucket b6. The mapping 120C maps the bucket b7 to the metadata of bucket b7, the bucket b8 to the metadata of bucket b8, and the bucket b9 to the metadata of bucket b9. Each of the mappings may be referred to as BucketInfoMap.

The federation service 105 manages the global state of the federation 100. In some embodiments, the federation service 105 includes a mapping 125 that maps each bucket to an object store that hosts the bucket. For example, the mapping 125 maps the buckets b1, b2, and b3 to the object store 110A, the buckets b4, b5, and b6 to the object store 110B, and the buckets b7, b8, and b9 to the object store 110C. The mapping 125 may be referred to as BucketConfigMap. The mapping 125 may be considered to provide a global namespace that may be globally available and accessible by the members of the federation 100. The individual mappings of the mapping 125 may be referred to as indirection data. In some embodiments, the indirection data may be cached. Although not shown, in some embodiments, the federation service 105 includes a mapping that combines the mappings 125, 120A, 120B, and 120C.

The federation service 105 may include, or be associated with, a federation controller (FC) 130. The federation controller 130 may be used to expose a federation service API that users may use to access the object stores 110. In some embodiments, the FC 130 includes instances that are distributed across some or all the object stores 110. For example, the FC 130 may include a first FC instance hosted on the object store 110A, a second FC instance hosted on the object store 110B, and a third FC instance hosted on the object store 110C. Additional details of the FC 130 and creating the federation 100 and a federation namespace are discussed in U.S. application Ser. No. 18/351,876, filed on Jul. 13, 2023, the entirety of which is incorporated by reference herein.

Figure 2:
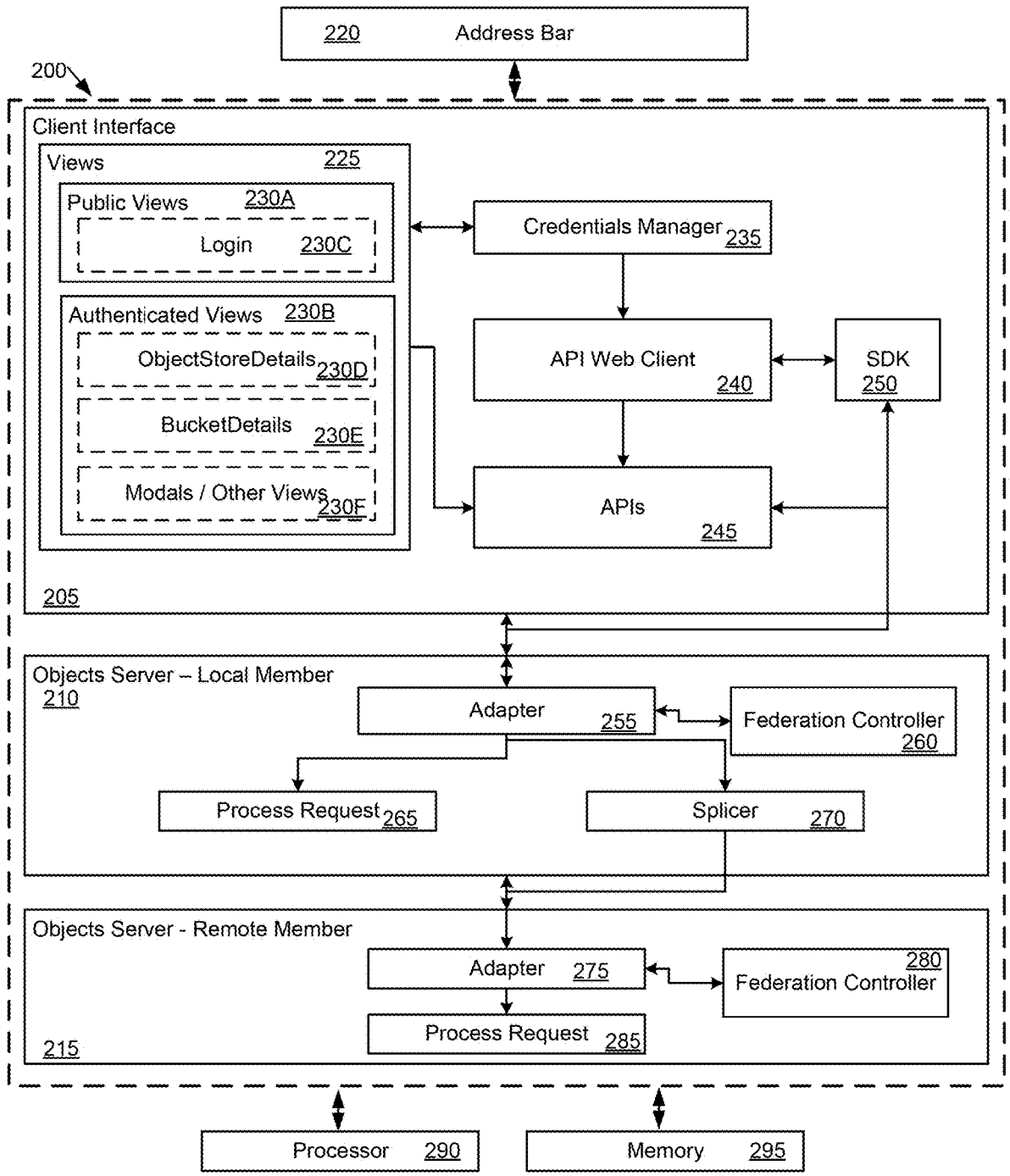
FIG. 2 is an example block diagram of the objects browser of FIG. 1.

Turning to FIG. 2, an example block diagram of an objects browser 200 is shown. The objects browser 200 is analogous to the objects browser 115. The objects browser 200 includes a client interface 205, an objects server for a local member 210, and an objects server for a remote member 215. The client interface 205 provides a user interface to a user and forms the front-end of the objects browser 200. The objects server for the local member 210 and the objects server for the remote member 215 form the backend of the objects browser 200. Each of the object stores 110 may have an instance of the objects browser 200. In other words, each of the object stores 110 may have an instance of the client interface 205, the objects server for the local member 210, and the objects server for the remote member 215. In some embodiments, one or more of the object stores 110 may not have all three components (the client interface 205, the objects server for the local member 210, and the objects server for the remote member 215) of the objects browser 200. In some embodiments, the objects server for the local member 210 may be used to access and perform operations on the local object store and to redirect requests made to the local object store for access of a remote object store. The objects server for the remote member 215 may be used by remote object stores to receive requests from other object stores and for performing the operations on the remote object store in response to the received requests. In some embodiments, the objects server for the local member 210 and the objects server for the remote member 215 may be a single component performing the operations of the individual components. In some embodiments, the objects browser 200 may include other or additional components.

The client interface 205 of the objects browser 115 may be reached by a user entering a URL in an address bar 220. The address bar 220 may be a web browser on the device (e.g., laptop) from which the user is accessing the objects browser 115. The URL that the user may enter in the address bar 220 may be a path-based URL. For example, if the object store name is "objstoretest" and domain name is "nutanix.com," the Fully Qualified Domain Name (FQDN) for the object store may be "objstoretest.nutanix.com" (e.g., object store name+domain name). The path-based URL for accessing the object browser 115 user interface may be "https://objstoretest.nutanix.com/objectsbrowser." In some embodiments, a virtual URL may be used for the accessing the objects browser 115: "https://objectsbrowser.objstoretest.nutanix.com." In some embodiments, a path-based URL may be preferred due to cross-origin resource sharing (CORS) configurations.

In some embodiments, the URL may provide an indication whether a user is intending to access a local object store or a remote object store that is part of the federation service 105. For example, if the objects browser 200 is being accessed through the object store 110A, the URL entered into the address bar 220 may provide an indication whether the user is intending to access the object store 110A or whether the user is intending to access the object stores 110B or 110C.

The URL may include the FQDN which identifies an object store to be accessed following by a domain name. In other words, the FQDN may be a combination of the object store name and the domain name. The URL may also include a federation namespace query parameter value that identifies the name of a federated namespace (e.g., the namespace of the federation 100). An example URL may be https://ostore-1.nutanix.com/objectsbrowser?namespace-fed-1. In this URL, "ostore-1.nutanix.com" may be the FQDN indicating that the user is attempting to access the object store having the name of "ostore-1" and the federation namespace query parameter value of "fed-1" indicating that the "ostore-1.nutanix.com" is part of the federation having the name of "fed-1." The federation namespace name may have the following features: (1) The federation name may start with a letter; (2) The name has alphanumeric or hyphen characters. Hyphen may be used in the middle of the name; (3) The name does not contain special characters; (4) The name has a minimum of 1 and a maximum of 16 characters. The federation namespace name and/or the URL may include other or additional information.

In some embodiments, users do not have to remember the name of buckets in the object store that is desired to be accessed. When a user logs into the objects browser 200, the users may be presented with a list of all buckets which are part of the federation namespace. The user may select any bucket to perform operations thereon (e.g., browse contents, add objects, delete objects, modify objects, etc.). Once a user selects a bucket, the URL may be updated to access the bucket. For example, if the user has selected bucket "bucket1" from the buckets list, the URL in the address bar 220 may be automatically updated as follows: "https://ostore-1.nutanix.com/objectsbrowser?namespace=fed-1/#/app/ostore-buckets/bucket1/objects."

The client interface 205 may also provide various views 225 to the user. The views 225 may define the user interface components, pages, and related assets such as Cascading Style Sheets (CSS), images, etc. Depending on the level of access of the user, the views 225 may be either public views 230A or authenticated or private views 230B. The public views 230A may include views that do not require user authentication and may be accessed publicly by any user. The user may login 230C into the objects browser 200 to view the authenticated views 230B. The authenticated views 230B are views that may be accessed by a user after authentication. For example, after a user logs into the objects browser 200 using a username/password, access key, secret key, or another type of authentication, the user may access the authenticated views 230B. Without the proper credentials, the user may be prevented from seeing the authenticated views 230B. In addition to the information accessible through the public views 230A, the authenticated views 230B may also provide access to object store details 230D of one or more object stores (e.g., the object stores 110) in the federation 100, bucket details 230E of one of more buckets in the object stores (e.g., the buckets in the object stores 110), modal views 230F such as static website, feature specific views, bucket tagging policy, and any other information to be displayed.

The client interface 205 may also include a credentials manager 235. The credentials manager 235 may be part of the backend components of the objects browser 200 although shown as part of the client interface 205. The credentials manager 235 is a helper utility which is responsible for maintaining the constructs required for user authentication. Specifically, the credentials manager 235 is a client-side authentication manager which provides a single source of authentication for providing details like access key, secret key, region, and federation namespace name to any other client-side component like the views 225, an API web client 240, etc. For example, the objects browser 200 may use APIs 245 (e.g., native S3 APIs) which may not have server-side sessions (e.g., the client itself may be responsible for generating the signature using the keys and the region). The credentials manager 235 may provide the information to generate the signature. In some embodiments, the objects browser 200 may be a Single Page Application (SPA) such that the objects browser doesn't do a full-page load after the objects browser loads once. The credentials manager 235 may be initialized with a "region" when the objects browser 200 is loaded for the first time (e.g., by using a GET request to "https://ostore-1.nutanix.com/?oss-region" endpoint). The "https://ostore-1.nutanix.com/?oss-region" may be an unauthenticated endpoint which provides the "region" value (e.g., oss-region in the URL above). In case of on-premises objects solution, the region may be an arbitrary value (e.g., which helps in supporting the S3 standard and maximize application/integration compatibility for S3). For example, the objects browser 200 may use "us-east-1" as the default value of region for an on-premise solution that may be configured through a deployment flag later. The "region" may or may not be the location of object store being accessed. The federation namespace name may be initialized in the credentials manager 235 during the first load of the objects browser 200, by getting the value of the namespace query parameter from the launch URL. Once the user logs in (by providing access and secret key) and is validated, the credentials manager 235 may save these access and secret keys for further use. The credentials manager 235 persists the values of the secret and access keys in memory and doesn't store the keys in any persistent storage (like local storage or session storage). Once the objects browser page is reloaded, the values are no longer available and the credential manager 235 has to be re-initialized by requesting the user to log in again.

Thus, the credentials manager 235 provides a mechanism to access region, access key and secret key by the views 225 and by the API web client 240. In case of federated access via the federation 100, the credentials manager 235 also provides support to expose the federation name to users. The API web client 240 may be a global web client (e.g., an S3 web client) responsible for initializing and calling the specific APIs (e.g., S3 APIs) 245. The API web client 240 may use the credentials manager to load the details like region, keys, and federation namespace, and initialize a single API web client shared by all API calls. The APIs 245 may be used for performing specific operation, such as listing the buckets, creating a bucket, uploading an object etc. The API web client 240 may be a singleton module which may be used by the objects browser 115 to invoke the APIs 245. The API web client 240 may wrap the common features required by the specific APIs 245 and provide a base infrastructure to invoke them when needed by specific workflows in the client interface 205. When the API web client 240 is referenced for the first time, the API web client may use the credentials manager 235 to request the region, access key, secret key and federation namespace name from the credentials manager. The region, access key, and secret key may be used to generate the API web client 240. If these attributes (e.g., the region, access key, secret key) are not provided by the credentials manager 235 (e.g., because the credentials manager does not access to these attributes or page is reloaded by user), the "API web client" 240 may send out a logout signal to the client interface 205 to request the user for the credentials again. If the attributes are provided by the credentials manager 235 (e.g., when the user logs in with correct credentials), the API web client 240 may use software development kit (SDK) 250 (e.g., a JavaScript SDK) to generate the base client. The API web client may use a global value in the module to maintain only one reference. Each of the APIs 245 may be called with the help of API web client 240 and the SDK 250. The SDK 250 is responsible for handling the request payload creation, signing the requests and response transformation for user interface consumption, etc. The SDK 250 may be used by the API web client 240 and the APIs 245. For example, upon successful authentication, if a user desires to list the buckets, the following steps may be performed:

Get the reference to the "API web client 240"
    Get the reference to the specific API (e.g., the S3 API) from the SDK 250, in this case "ListBuckets"
    Pass the parameters required for calling the API in the form a json object, e.g., in this case {"maxKeys: 50"}
    The SDK 250 may then generate the specific request URL and method, e.g., GET https://ostore-1.nutanix.com/?max-keys=50
    The SDK 250 may add necessary parameters in the request body (e.g., in case of POST, PUT methods). The APIs 245 may include an extendible markup language (XML) string in the request payload. The SDK 250 may take care of transforming the json payload and convert the payload into the XML string understood by the API (e.g., S3) server (when applicable).
    The SDK 250 may generate a v4 signature for the request and add it as part of request header "Authorization."
    The SDK 250 may use the underlying platform (e.g., the web browser from which the objects browser 115 is accessed) to make an API call using fetch and get the XML string response.
    The SDK 250 may determine if the federation namespace is present in the underlying API web client 240 and add the namespace to the request header "x-ntnx-namespace-name" before computing the signature.
    The SDK 250 may parse the XML string response into json and return back to the objects browser 115.
    The SDK 250 may similarly make other API calls.

The objects server for the local member 210 communicates with the client interface 205 via the SDK 250. The objects server for the local member 210 represents an endpoint (e.g., an S3 endpoint) to which the client interface 205 connects with. The objects browser 200 is hosted on the local object store (e.g., the underlying object store on which the objects server for the local member is located), locally in a bucket, using a static website and connected to the objects server for the local member 210 by using a path based URL (e.g., the launch URL entered into the address bar 220). The objects server for the local member 210 may perform operations on the underlying object store (e.g., handle local requests). The objects server for the local member 210 may also be configured to route requests to remote object stores. The objects server for the local member 210 may include an adapter 255, a federation controller 260, a process request 265, and a splicer 270.

The adapter 255 (e.g., an S3 adapter) may expose an API (e.g., an S3 API) for requesting bucket and object operations such as create (e.g., first Put/write), update (e.g., subsequent Put/write), lookup (e.g., Get/read), list, delete, etc. on the underlying object store. In particular, the adapter 255 may be responsible for parsing and validating all the details in a request received from the client interface 205. For example, the syntax for issuing an S3 API may be defined by AWS S3: http{s}://FQDN/bucket_name/object_name?operation¶meter. The adapter 255 may parse the request to identify various details from the request based on the syntax. The adapter 255 may validate the object name, bucket name, etc. The adapter 255 may also classify the request as a federated request or a local request based on the API request received from the SDK 250. For example, the API request received from the SDK 250 may include a header (e.g., x-ntnx-namespace-name header described below). Based on the presence of the header, the adapter 255 may determine whether the request is a federated request or a local request. For example, if the header is present in the request, the adapter 255 may determine that the request is a federated request. If no header is present in the request, the adapter 255 may determine that the request is a local request. For a federated request, the adapter 255 may also verify the membership (e.g., verify which object stores are part of the federation 100) and identify the object store hosting the bucket to which access is requested and whether the object store is part of the federation.

The federation controller 260 is analogous to the federation controller 130 which manages the federated namespaces. The federation controller 260 may provide federation metadata when the request includes a federated request. For example, the federation controller 260 may receive a request from the adapter 255 when the adapter receives a federated request. The request from the adapter 255 may be a metadata request and may identify the federation service 105 (e.g., identify the federation name). In response to receiving the metadata request, the federation controller 260 may retrieve metadata associated with the federation service 105 and send the metadata to the adapter 255. In some embodiments, the federation controller 260 may also receive metadata from the adapter 255 for storing. If the adapter 255 determines that the API request received from the SDK 250 is a local request, the adapter may transmit that request to the process request 265. The process request 265 may perform the operations called for by the request on the local object store. On the other hand, if the adapter 255 determines that the request is a federated request, the adapter may transmit that request to the splicer 270, which is a proxy or transport forwarder to forward or redirect the request to a remote object store.

The objects server for the remote member 215 receives the redirected request from the splicer 270. In some embodiments, the redirected/forwarded request may be the same as the original request that landed on the objects server for the local member 210. The objects server for the remote member 215 is associated with the remote object store. For example, if the request originates from the object store 110A for access to the object store 110B, the objects server for the local member 210 associated with the object store 110A receives the request and redirects the request to the objects server for the remote member 215 associated with the object store 110B. In particular, adapter 275 of the objects server for the remote member 215 receives the redirected request from the splicer 270. The adapter 275 is similar to the adapter 255. The adapter 275 is also associated with a federated controller 280, which similar to the federation controller 260, provides metadata related information of the federation service 105. The adapter 275, upon verification of the request, transmits the request to process request 285 which accesses the requested bucket and performs the operations called for by the request.

The objects browser 200 may be associated with a processor 290 and a memory 295. The processor 290 may execute one or more instructions associated with the objects browser 200. The processor 290 may include an electronic processor, an integrated circuit, or the like including one or more of digital logic, analog logic, digital sensors, analog sensors, communication buses, volatile memory, nonvolatile memory, and the like. The processor 290 may include, but is not limited to, at least one microcontroller unit (MCU), microprocessor unit (MPU), central processing unit (CPU), graphics processing unit (GPU), physics processing unit (PPU), embedded controller (EC), or the like. The processor 290 may include, or be associated with, the memory 295 operable to store or storing one or more non-transitory computer-readable instructions for operating components of the system processor and operating components operably coupled to the system processor. The one or more instructions may include at least one of firmware, software, hardware, operating systems, embedded operating systems, and the like. The processor 290 or the objects browser 200 generally may include at least one communication bus controller to effect communication between the system processor and the other elements of the objects browser 200.

The memory 295 may include one or more hardware memory devices to store binary data, digital data, or the like. The memory 295 may include one or more electrical components, electronic components, programmable electronic components, reprogrammable electronic components, integrated circuits, semiconductor devices, flip flops, arithmetic units, or the like. The memory 295 may include at least one of a non-volatile memory device, a solid-state memory device, a flash memory device, a NAND memory device, a volatile memory device, etc. The memory 295 may include one or more addressable memory regions disposed on one or more physical memory arrays.

The various communications in the objects browser 200 may occur over a network. The network may be any type or form of network. The geographical scope of the network may vary widely and may include a body area network (BAN), a personal area network (PAN), a local-area network (LAN) (e.g., Intranet), a metropolitan area network (MAN), a wide area network (WAN), or the Internet. The topology of the network may assume any form such as point-to-point, bus, star, ring, mesh, tree, etc. The network may utilize different techniques and layers or stacks of protocols, including, for example, the Ethernet protocol, the internet protocol suite (TCP/IP), the ATM (Asynchronous Transfer Mode) technique, the SONET (Synchronous Optical Networking) protocol, the SDH (Synchronous Digital Hierarchy) protocol, etc. The TCP/IP internet protocol suite may include application layer, transport layer, internet layer (including, e.g., IPv6), or the link layer. The network may be a type of a broadcast network, a telecommunications network, a data communication network, a computer network, a Bluetooth network, or other types of suitable wired and wireless networks.

Figure 3:
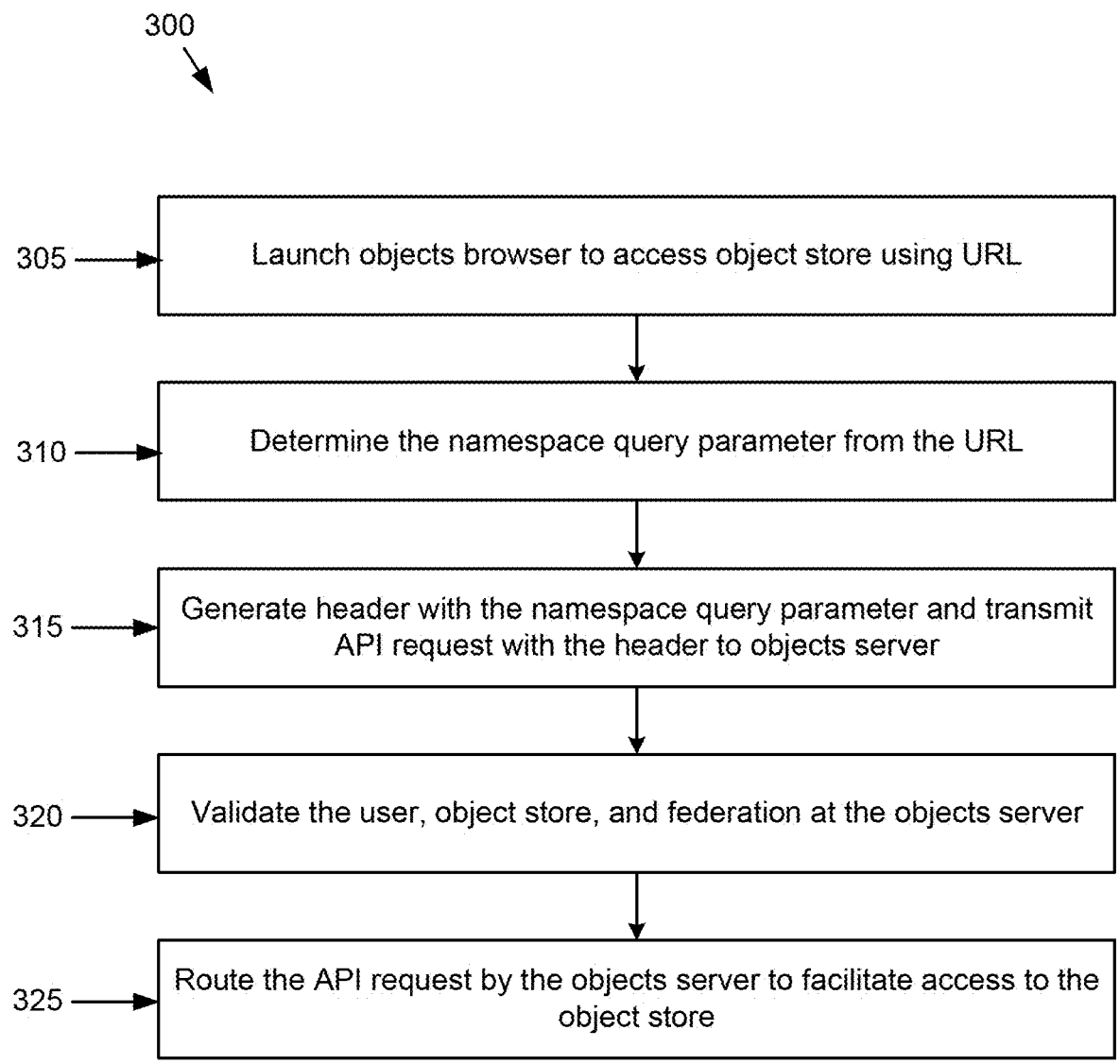
FIG. 3 is an example flow chart outlining operations of a process for accessing a remote object store in the federation namespace of FIG. 1 using the objects browser of FIGS. 1 and 2.

Turning to FIG. 3, an example flowchart outlining the operations of a process 300 is shown. The process 300 may be used to access a federated namespace using an objects browser (e.g., the objects browser 200). For example, the process 300 may be used to access the object stores 110 associated with the federated namespace associated with the federation 100 using the objects browser 115, 200. The operations of the process 300 may be performed by the processor 290. In particular, the processor 290 may execute non-transitory computer-readable instructions stored on a computer-readable media such as the memory 295. The process 300 may include other or additional operations. The process 300 includes operation 305 at which the objects browser 200 is launched. Launching the objects browser 200 may be indicative of a user request to access an object store (e.g., one of the object stores 110). The request may be for requesting access to a local object store or a remote object store. For ease of explanation, the description below describes using the objects browser 200 on the object store 110A to access a bucket/object on object store 110B (e.g., access of a remote object store).

To access the object store 110B from the object store 110A, a user may identify the federation namespace name (e.g., fed-1) associated with the federation (e.g., the federation 100) of which the object stores 110A and 110B are part of. The federation namespace name is also referred to as the namespace query parameter. The user may also identify the FQDN (e.g., ostore-1) of the object store 110B to access. In some embodiments, instead of the FQDN, the user may identify the IP address of the load balancer associated with the object store 110B. The IP address may map to the FQDN using a Domain Name Server (DNS). The user may launch the objects browser 200 using the IP address. In some embodiments, the user may launch the objects browser 200 through the object store 110A, through the buckets list page of the object store 110A, a URL for the object store (e.g., http://objects-public-ipaddress/objectsbrowser), or in any other way.

To launch the objects browser 200 for accessing the object store 110B, the user may enter the URL (also referred to herein as launch URL) in the address bar 220 of a web browser. The launch URL may vary based on whether access to a local object store or a remote object store is desired. For example, for accessing the object store 110B (e.g., ostore-1) locally, the user may access the objects browser on the object store 110B by entering the launch URL, https://ostore-1.nutanix.com/objectsbrowser (FQDN based) or https://objects-public-ipaddress/objectsbrowser (IP address based), into the address bar 220 of a web browser to send a request to launch the objects browser for accessing the object store 110B locally. Or the user may enter https://ostore-1.nutanix.com/objectsbrowser?namespace=fed1 from the object store 110A in the address bar 220 of the web browser to launch the objects browser 200 for federated access of the federation namespace fed1 and the object store 110B (e.g., ostore-1) remotely. The URL request may return an HTML page (and associated scripts/CSS) which is rendered by the web browser. The rendered page may be the objects browser application associated with the objects browser 200. In particular, the URL may redirect the user to a login page of the objects browser application (see FIG. 6).

Upon accessing the login page, the user may log into the objects browser 200 using access and secret keys associated with the user (regardless of whether local or remote access is desired). In some embodiments, each user may be assigned one or more access keys and one or more secret keys. The user may use the access key and the secret key to log into the objects browser 200. Upon logging into the objects browser 200, the user may view the authenticated views 230B, as well as access the list of buckets that are part of the federation (and that the user has access to), and perform operations on the buckets of the object stores (e.g., create buckets, upload data to the buckets, download data from the buckets, manage versions of data, manage lifecycle rules, configure static websites, set bucket policies, etc.).

At operation 310, the objects browser 200, and particularly the credentials manager 235, determines whether the launch URL includes a namespace query parameter. In other words, the objects browser 200 determines whether the request is to access a local object store (e.g., the object store 110A) or a remote object store (e.g., the object store 110B). If the URL includes a federation namespace name (e.g., fed-1), the objects browser 200 determines that the request is for accessing a remote object store (e.g., the object store 110B) in the federation service 105. If the URL does not include a federation namespace name, then the objects browser 200 determines that the request is for accessing a local object store. An example URL for a local access may be "https://objects-public-ipaddress/objectsbrowser." An example URL for a federated access may be https://ostore-1.nutanix.com/objectsbrowser?namespace=fed1."

At operation 315, upon determining that the launch URL includes the namespace query parameter (e.g., fed-1), the objects browser 200 invokes the APIs 245 via the API web client 240 and SDK 250 to generate an API request including an API header. The API web client 240 may receive the access key, the secret key, region, and federation namespace name from the credentials manager 235 and create a base client. The SDK 250 may use the base client generate the API request. The API request may be signed based on the information received from the credentials manager 235. The signature on the API request may provide authentication and authorization of the user. The signature may confirm that the user has used right access and secret keys while making the API call.

The API header may include the federation namespace name determined from the launch URL. An example of the API header may be "x-ntnx-namespace-name." The API header may be added as an additional header in the API request to the objects server for the local member 210. The API header (also referred to herein as a request header) may be a key-value pair, where the key may be "x-ntnx-namespace-name" (e.g., fixed identifier) and the value may be the name (e.g., fed-1) of the federation namespace. Non-limiting examples of the API header may include:
x-ntnx-namespace-name: fed-1
x-ntnx-namespace-name: test-name
x-ntnx-namespace-name: another-test-ns The fixed identifier in the API header may also vary from one embodiment to another. The "x-" at the beginning of the API header may be a prefix used for denoting a custom request header (e.g., which may not be part of a standard API request) and may be used by web applications to provide custom functionality. "x-ntnx" after the "x-" prefix may be another prefix for the entity providing the objects solution (e.g., Nutanix). The SDK 250 sends the API request including the additional header to the objects server for the local member 210 at operation 320.

On receiving the API request, the objects server for the local member 210, and particularly the adapter 255, may regenerate the signature from the access key and the secret key included in the API request and compare the regenerated signature with the signature included in the API request to verify authenticity of the user and the API request. The adapter 255 may also perform other validation operations. For example, the adapter 255 may validate the federation 100. In particular, the adapter 255 may determine that a federation service of the name mentioned in the header exists and that the user has access to the federation namespace. The adapter 255 may also identify the object store(s) (e.g., the object stores 110) that are part of the federation service 105 and whether the user has access to the object store that the user is trying to access. The adapter 255 may perform other validation actions.

Upon authentication, the objects server for the local member 210, and particularly the adapter 255, may check for the presence of the header "x-ntnx-namespace-name" in the API request. If that header is present, the adapter 255 may determine that the API request is to access a bucket on a remote object store (e.g., the object store 110B) and forward the API request to the splicer 270. In particular, the adapter 255 may receive the API request with the API header and check which object store is hosting the bucket to which access is desired (indicated in the API request) using the federation controller 260. For example, the adapter 255 may send a metadata request including the name (or other identification information) of the bucket to the federation controller 260. The federation controller 260 may determine the location of that bucket and send the location (e.g., the mapping 125) and any other metadata back to the adapter 255. Based at least on the received mapping 125 and any other metadata, the adapter 255 may validate the federation 100 and the object stores 110 that are part of the federation. The adapter 255 may also confirm that the user has access to the federation and the requested object store based on the metadata. Based on the returned location, the adapter 255 may also determine whether the bucket is hosted on a local object store (e.g., the object store 110A) or a remote object store (e.g., the object store 110B). If the location indicates a remote bucket (e.g., hosted on a remote object store), the adapter 255 forwards the API request with the API header to the splicer 270 at operation 325. If the API header is not present in the API request, the objects server for the local member 210 may determine that the API request is for accessing a local object store (e.g., the object store 110A).

Thus, at operation 325, the splicer 270 receives the API request including the API header and transmits the API request and API header to the objects server for the remote member 215. Specifically, the splicer 270 sends the request to the objects server for the remote member associated with the object store 110B. The adapter 275 of the objects server for the remote member 215 receives the request and passes the request to the process request 285 to complete/handle.

Figure 4:
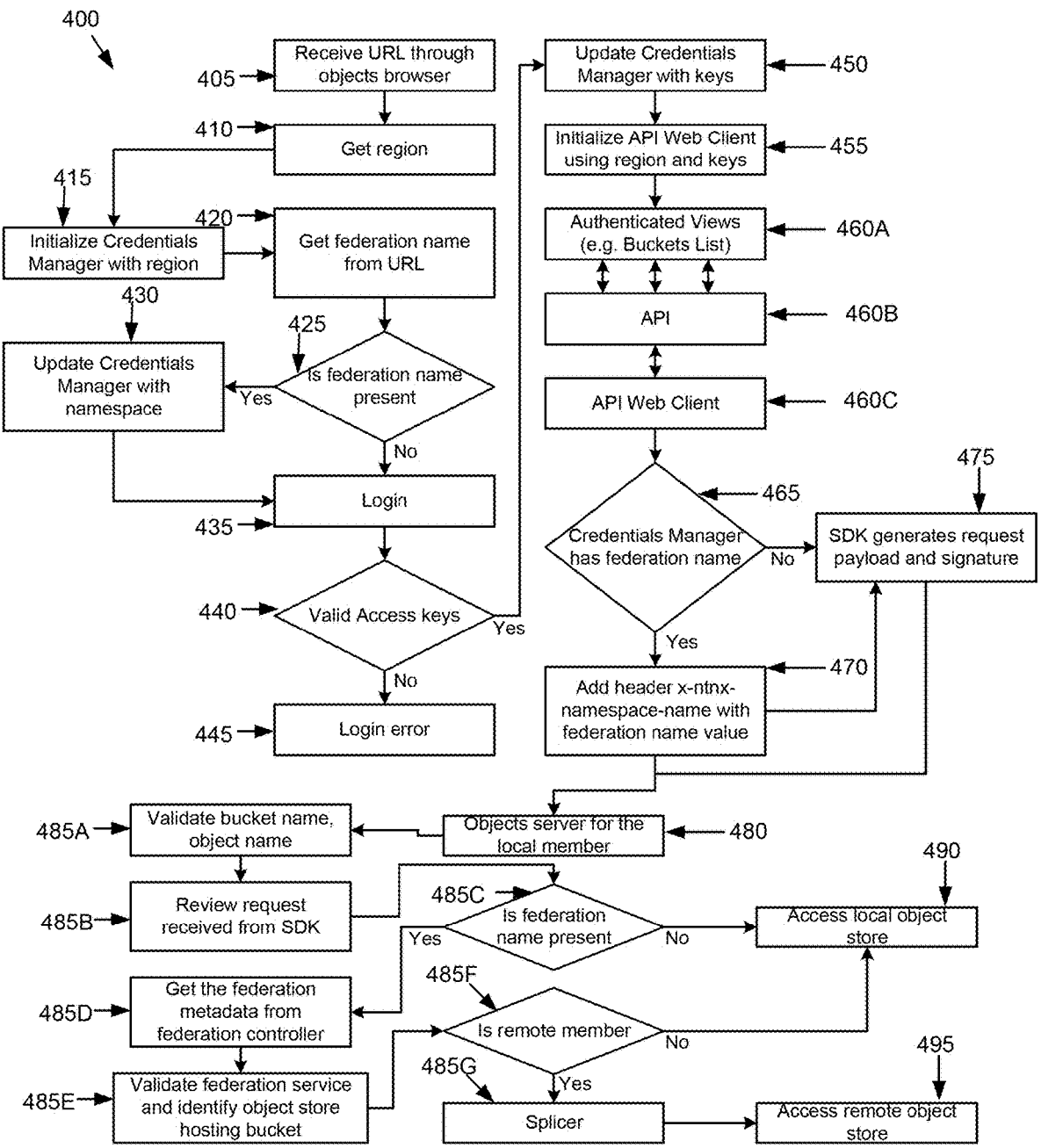
FIG. 4 is another example flow chart outlining operations of a process for accessing a local object store or a remote object store in the federation namespace of FIG. 1 using the objects browser of FIGS. 1 and 2.

Turning to FIG. 4, an example flowchart outlining the operations of a process 400 is shown. The process 400 may be used to access an object store (whether local or remote) using an objects browser (e.g., the objects browser 200). For example, the process 400 may be used to access the object stores 110 associated with the federation 100 using the objects browser 115, 200. The operations of the process 400 may be performed by the processor 290. In particular, the processor 290 may execute non-transitory computer-readable instructions stored on a computer-readable media such as the memory 295. The process 400 may include other or additional operations. For ease of explanation, the description below describes using the objects browser 200 on the object store 110A to access a bucket/object on either the object store 110A or the object store 110B.

At operation 405, the objects browser 200 receives the launch URL similar to the operation 305. At operation 410, the objects browser 200 determines the region of the object store that the user is trying to access. In particular, the objects browser 200 may use unauthenticated APIs to get the region of the object store. The region may be the location where the object store is located. Since the federation service 105 may include multiple object stores each of which may be located in a different location, the objects browser 200 may determine the location of the region where the object store to be accessed is located. For example, if the user entered https://ostore-1.nutanix.com/objectsbrowser?namespace=fed-1 into the address bar 220, the objects browser 200 may determine the region associated with "ostore-1." The objects browser 200 may fetch the region by invoking, for example, and API endpoint "https://objects-public-ipaddress/?oss-region." This API call may return an arbitrary region (e.g. "us-east-1") which may be used by the object store on which objects browser is hosted on.

At operation 415, the region is transmitted to the credentials manager 235. In particular, the credentials manager 235 is initialized with the region for authenticating the user and for generating a signature for the user to access the object store (e.g., ostore-1). In particular, the "region" from the operation 410 along with other values like access key, secret key, and the request payload (e.g., request method, request URL, request headers, request body, etc.) are used to generate a signature (e.g., a V4 signature) by the SDK 250. The signature may be added as a request header "Authorization' in each API call. The signature establishes the authentication and also serves as a mechanism to validate the correctness of payload.

At operation 420, the credentials manager 235 analyzes the URL entered at the operation 405 to determine if a federation namespace name is present in the objects browser launch URL (using query parameter "namespace"). At operation 425, if the federation namespace name is present in the URL, at operation 430 the credentials manager 235 is updated with the namespace of the federation service 105. In particular and as discussed above, the API web client 240 uses information from the credentials manager 235 to make API calls. The operation 420 collects the information from different inputs (e.g. region from an API call to/?oss-region, federation name from launch URL, access/secret key from the login page user inputs) and stores the collected information in the credentials manager 235. Later, when the API web client 240 or the views 225 need one or more of the above information, the credentials manager 235 may be able to provide the information without needing to collect the information again.

Regardless of whether the federation namespace is present or not in the URL, at operation 435, the user is requested to log into the objects browser 200. The presence of the federation namespace name in the URL indicates that the request is to an object store that is part of the federation service 105. The presence of the federation namespace name in the URL also indicates that the request is for accessing a remote object store (e.g., the object store 110B) in the federation service 105. If the federation namespace name is not present in the URL, the request may be to access a local object store (e.g., the object store 110A). The user may log into the objects browser 200 using the access keys assigned to the user. At operation 440, validity of the access key and the secret key is checked by making an API call (e.g., a bucket listing API https://objects-public-ipaddress/?max-keys=1) using the available information (e.g., region, access key, secret key) by the SDK 250. In case the keys are correct, the signature generated is correct and the objects server for the local member 210 may send back a "200 status code" indicating a successful login. In case the keys are not valid, the status code may be "401" or "403" indicating a failed login and, the user may be prevented from accessing the federation service 105 object stores and presented a login error at operation 445. If the access keys are valid, at operation 450, the credentials manager 235 is updated with the access keys. At this point, the credentials manager 235 may have 4 pieces of information: the federation namespace name, the region, the access keys of the user, and the secret key of the user. The signature may be generated each time an object store operation is performed, for example, when buckets are listed, when buckets are created, when objects are uploaded, when objects are listed, etc. The signature may be dependent on each operation's request method, request URL, request body, any additional headers etc. These values along with information saved in the credentials manager 235 may be used by the SDK 250 to generate signature for each object store operation.

Upon successful logging into the objects browser 200, the credentials manager 235 initializes the API web client 240 at operation 455 with the region determined at the operation 410, the access keys, and the secret key of the user. Initializing the API web client 240 means that a reference of a client (e.g., an S3 client) may be using the available information (e.g., federation namespace name, region, access key, and secret key) from the credentials manager 235. A single instance of the client may be used for performing any object store operations in the objects browser in each session. Once the API web client 240 is initialized, the generated client may be used by all API calls. The initialization provides the available information mentioned above. Any specific information for a particular API call may be provided later when that API call is actually made. For example, when a user wants to list the buckets, the following operations may be performed:

(1) Get the web client reference (which is already initialized); and (2)—Provide the specific information for bucket listing, for e.g. maxKeys (which tells how many buckets should be returned by server at maximum.)

In addition to initializing the API web client 240, the user is allowed to see the authenticated views 230B as indicated at operation 460A. In some embodiments, the authenticated views 230B may show data only when the API web client 240 is initialized with the right information. If the API web client 240 is not initialized (e.g. user tries to access an authenticated view directly by providing that view URL in the web browser's address bar 220 without a login), the access may be considered non-authenticated access and user may be redirected to login page for providing the credentials (access key and secret key).

The API web client 240 invokes the APIs 245 (e.g., authenticated APIs), as indicated at operations 460B and 460C, to request access to the object store. At operation 465, the SDK 250 determines if the credentials manager 235 has the federation namespace name and generates a header (e.g., the x-ntnx-namespace-name) for making a federated request to access a remote object store at operation 470 responsive to determining that the federation namespace name exists. If the SDK 250 determines that the credentials manager 235 does not have a federated namespace name, the SDK generates a local request API request payload that does not include the header x-ntnx-namespace-name at operation 475.

The API request may be different for different requested object store operations. The API request may also be different based on whether the request is a federated request or not (e.g., request to a local object store versus a remote object store). Each API request may include the signature irrespective of whether the API request is for federated access or not. The SDK 250 sends an API request with the header from the operation 470 or an API request without the header from the operation 475 to the objects server for the local member 210 (e.g., associated with the object store 110A) at operation 480. The operations 405-475 are performed in the client interface 205. The adapter 255 of the objects server for the local member 210 reviews the API request received from the SDK 250 to determine and validate the bucket name and/or the object name to be accessed by the user at operation 485A. At operation 485B, the adapter 255 reviews the API request received from the SDK 50 to determine, at operation 485C, if the header, and therefore, the federation namespace name is present with the API request. If the federation namespace name is not present, the adapter 255 determines that the API request from the SDK 250 corresponds to a local request for accessing the local object store (e.g., the object store 110A) and transmits the request to the process request 265 at operation 490 to handle the request. If the federation namespace name is present in the information received, the adapter 255 determines that the API request corresponds to a federated request and gets metadata associated with the federation service 105 from the federation controller 260 at operation 485D. At operation 485E, the adapter 255 validates the federation service 105 and validates/identifies the object store (e.g., from the header) to be accessed (e.g., the object store 110B).

At operation 485F, the adapter 255 determines whether the object store to be accessed is a remote member (e.g., a remote object store). If yes, at operation 485G, the adapter 255 sends the federated request to the splicer 270 who transmits the request to the adapter 275 of the objects server for the remote member 215 at operation 495. If the adapter 255 determines, at the operation 485F, that the request is not to a remote member, the adapter sends the request to the process request 265 for handling as a local request at the operation 490.

Figure 5:
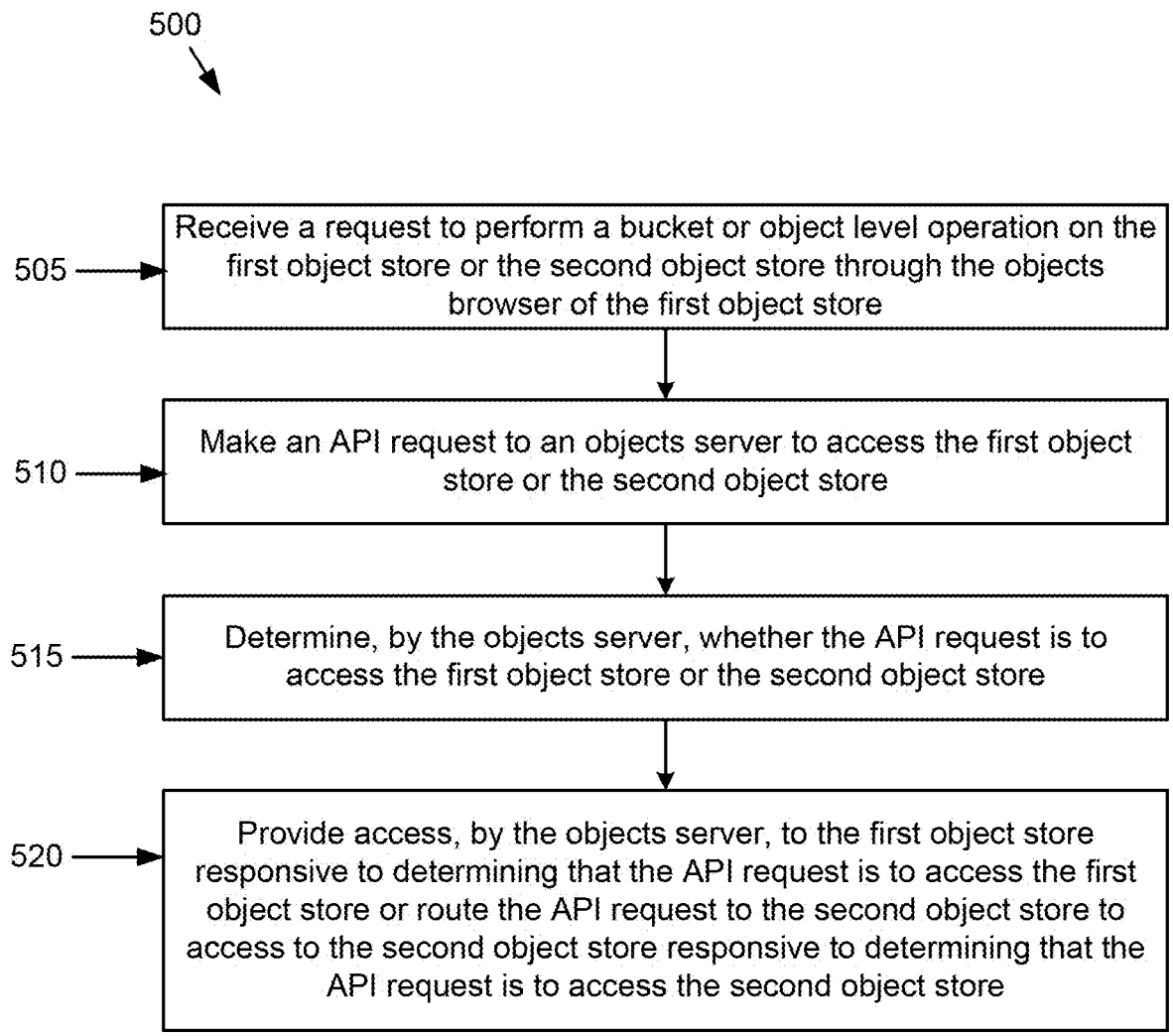
FIG. 5 is another example flowchart outlining operations of a process for accessing local object store or a remote object store in the federation namespace of FIG. 1 using the objects browser of FIGS. 1 and 2.

Referring now to FIG. 5, an example flowchart outlining the operations of a process 500 is shown. The process 500 may be used to access an object store (whether local or remote) using an objects browser (e.g., the objects browser 200). For example, the process 500 may be used to access the object stores 110 associated with the federation 100 using the objects browser 115, 200. The operations of the process 500 may be performed by the processor 290. In particular, the processor 290 may execute non-transitory computer-readable instructions stored on a computer-readable media such as the memory 295. The process 500 may include other or additional operations. For ease of explanation, the description below describes using the objects browser 200 on the object store 110A to access a bucket/object on either the object store 110A or the object store 110B.

At operation 505, the objects browser 200 receives a request through the address bar 220 in which a launch URL is entered. The request is to request access to an object store of the federation 100 having at least a first object store (e.g., the object store 110A) and a second object store (e.g., the object store 110B). The request may be received through the objects browser of the first object store (e.g., the object storer 110A) and may be for accessing either the first object store or second object store or the second object store.

At operation 510, the objects browser 200 makes an API request to a local objects server to access the first object store or the second object store. For example, the API web client 240 may invoke the APIs 245 and generate the API request. The API web client 240 may also generate an API header if the request includes a federation namespace name. The SDK 250 may send the API request with or without the header to an objects server (e.g., the objects server for the local member 210). The objects server, at operation 515, determines whether the API request is for accessing the first object store or the second object store. For example, the objects server may determine whether the API request includes a header or not. If the API request includes a header and the header includes the federation namespace name, the objects server may determine that the API request is for accessing the second object store (e.g., a remote object store). If the header is not included with the API request or the header is included but does not include the federation namespace name, the objects browser may determine that the API request is for accessing the first object store (e.g., a local object store). At operation 520, the objects server provides access to the first object store responsive to determining that the API request is to access the first object store (e.g., by sending the API request to the process request 265) or routes the API request, via the splicer 270, to the second object store (e.g., to the objects server for the remote member 215 of the second object store) to access to the second object store responsive to determining that the API request is to access the second object store.

Figure 6:
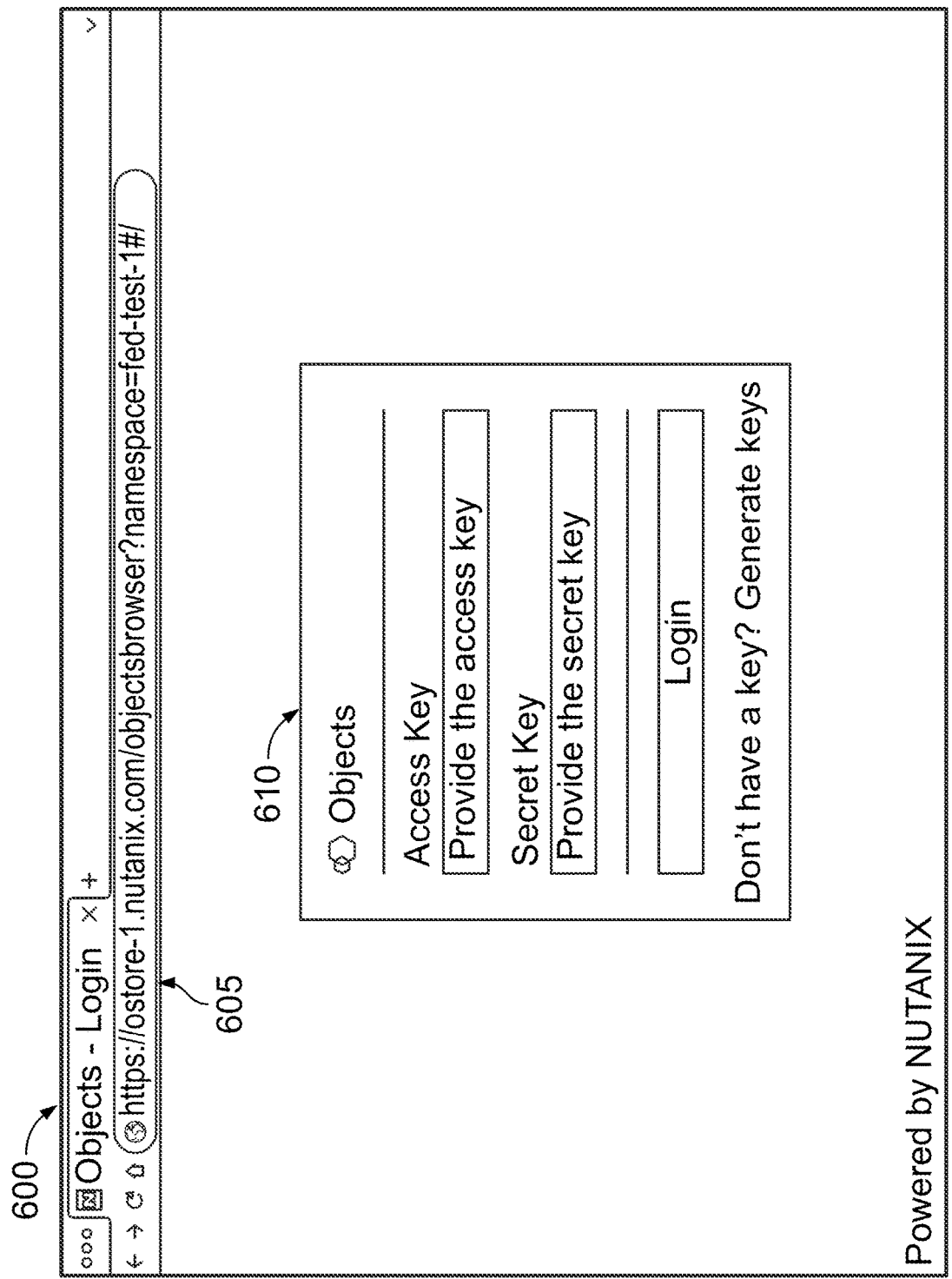
FIG. 6 is an example user interface of a landing page.

Turning to FIG. 6, an example user interface of a landing page 600 is shown. The landing page 600 may be displayed when the user enters a launch URL 605 in the address bar 220. The landing page 600 may present a login dialog box 610 requesting the user to log in using their access key and secret key. Upon successful authentication, the user may be permitted to view the authenticated views 230B.

Thus, using a single URL, the objects browser 200 provides a mechanism to access individual object stores that are either local or remote. It is to be understood that any examples used herein are simply for purposes of explanation and are not intended to be limiting in any way.

The herein described subject matter sometimes illustrates different components contained within, or connected with, different other components. It is to be understood that such depicted architectures are merely examples, and that in fact many other architectures can be implemented which achieve the same functionality. In a conceptual sense, any arrangement of components to achieve the same functionality is effectively "associated" such that the desired functionality is achieved. Hence, any two components herein combined to achieve a particular functionality can be seen as "associated with" each other such that the desired functionality is achieved, irrespective of architectures or intermedial components. Likewise, any two components so associated can also be viewed as being "operably connected," or "operably coupled," to each other to achieve the desired functionality, and any two components capable of being so associated can also be viewed as being "operably couplable," to each other to achieve the desired functionality. Specific examples of operably couplable include but are not limited to physically mateable and/or physically interacting components and/or wirelessly interactable and/or wirelessly interacting components and/or logically interacting and/or logically interactable components.

With respect to the use of substantially any plural and/or singular terms herein, those having skill in the art can translate from the plural to the singular and/or from the singular to the plural as is appropriate to the context and/or application. The various singular/plural permutations may be expressly set forth herein for sake of clarity.

It will be understood by those within the art that, in general, terms used herein, and especially in the appended claims (e.g., bodies of the appended claims) are generally intended as "open" terms (e.g., the term "including" should be interpreted as "including but not limited to," the term "having" should be interpreted as "having at least," the term "includes" should be interpreted as "includes but is not limited to," etc.). It will be further understood by those within the art that if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to disclosures containing only one such recitation, even when the same claim includes the introductory phrases "one or more" or "at least one" and indefinite articles such as "a" or "an" (e.g., "a" and/or "an" should typically be interpreted to mean "at least one" or "one or more"); the same holds true for the use of definite articles used to introduce claim recitations. In addition, even if a specific number of an introduced claim recitation is explicitly recited, those skilled in the art will recognize that such recitation should typically be interpreted to mean at least the recited number (e.g., the bare recitation of "two recitations," without other modifiers, typically means at least two recitations, or two or more recitations). Furthermore, in those instances where a convention analogous to "at least one of A, B, and C, etc." is used, in general such a construction is intended in the sense one having skill in the art would understand the convention (e.g., "a system having at least one of A, B, and C" would include but not be limited to systems that have A alone, B alone, C alone, A and B together, A and C together, B and C together, and/or A, B, and C together, etc.). In those instances where a convention analogous to "at least one of A, B, or C, etc." is used, in general such a construction is intended in the sense one having skill in the art would understand the convention (e.g., "a system having at least one of A, B, or C" would include but not be limited to systems that have A alone, B alone, C alone, A and B together, A and C together, B and C together, and/or A, B, and C together, etc.). It will be further understood by those within the art that virtually any disjunctive word and/or phrase presenting two or more alternative terms, whether in the description, claims, or drawings, should be understood to contemplate the possibilities of including one of the terms, either of the terms, or both terms. For example, the phrase "A or B" will be understood to include the possibilities of "A" or "B" or "A and B." Further, unless otherwise noted, the use of the words "approximate," "about," "around," "substantially," etc., mean plus or minus ten percent.

The foregoing description of illustrative embodiments has been presented for purposes of illustration and of description. It is not intended to be exhaustive or limiting with respect to the precise form disclosed, and modifications and variations are possible in light of the above teachings or may be acquired from practice of the disclosed embodiments. It is intended that the scope of the disclosure be defined by the claims appended hereto and their equivalents

What is claimed is:

1. A system comprising:
   one or more memories having computer-readable instructions stored thereon; and
   one or more processors of an objects browser that executes the computer-readable instructions to:
   receive a request through the objects browser of a first object store to perform an operation on either the first object store or a second object store, wherein the request comprises a uniform resource locator (URL), wherein the first object store and the second object store are part of a federated namespace comprising a plurality of object stores;
   determine that the URL comprises a name of the federated namespace;
   make an application programming interface (API) request comprising a header including the name of the federated namespace to an objects server to access the first object store or the second object store;
   determine, by the objects server, whether the API request is to access the first object store or the second object store; and
   provide access, by the objects server, to the first object store responsive to determining that the API request is to perform the operation on the first object store or route the API request to the second object store to perform the operation on the second object store responsive to determining that the API request is to perform the operation on the second object store.

2. The system of claim 1, wherein the URL comprises a fully qualified domain name of the first object store or the second object store to be accessed and a name of the federated namespace.

3. The system of claim 1, wherein the one or more processors further execute computer-readable instructions to determine, by the objects server, that the API request is to access the second object store responsive to identifying the name of the federated namespace in the header.

4. The system of claim 1, wherein the one or more processors further execute computer-readable instructions to determine, by the objects server, that the API request is to access the first object store based on the API request not including a name of the federated namespace in the API request.

5. The system of claim 1, wherein the one or more processors further execute computer-readable instructions to authenticate a user before making the API request.

6. The system of claim 1, wherein the objects server comprises an objects server for a local member associated with the first object store, and wherein to route the API request to the second object store, the objects server for the local member sends the API request to an objects server for a remote member associated with the second object store.

7. A non-transitory computer-readable media comprising computer-readable instructions stored thereon that when executed by one or more processors of an object browser cause the one or more processors to:
receive a request through the objects browser of a first object store to perform an operation on either the first object store or a second object store, wherein the request comprises a uniform resource locator (URL), wherein the first object store and the second object store are part of a federated namespace comprising a plurality of object stores;
determine that the URL comprises a name of the federated namespace;
make an application programming interface (API) request comprising a header including the name of the federated namespace to an objects server to access the first object store or the second object store;
determine, by the objects server, whether the API request is to access the first object store or the second object store; and
provide access, by the objects server, to the first object store responsive to determining that the API request is to perform the operation on the first object store or route the API request to the second object store to perform the operation on the second object store responsive to determining that the API request is to perform the operation on the second object store.

8. The non-transitory computer-readable media of claim 7, wherein the URL comprises a fully qualified domain name of the first object store or the second object store to be accessed and a name of the federated namespace.

9. The non-transitory computer-readable media of claim 7, wherein the one or more processors further execute computer-readable instructions to determine, by the objects server, that the API request is to access the second object store responsive to identifying the name of the federated namespace in the header.

10. The non-transitory computer-readable media of claim 7, wherein the one or more processors further execute computer-readable instructions to determine, by the objects server, that the API request is to access the first object store based on the API request not including a name of the federated namespace in the API request.

11. The non-transitory computer-readable media of claim 7, wherein the one or more processors further execute computer-readable instructions to authenticate a user before making the API request.

12. The non-transitory computer-readable media of claim 7, wherein the objects server comprises an objects server for a local member associated with the first object store, and wherein to route the API request to the second object store, the objects server for the local member sends the API request to an objects server for a remote member associated with the second object store.

13. A method comprising:
receiving, by one or more processors of an objects browser, a request through the objects browser of a first object store for performing an operation on either the first object store or a second object store, wherein the request comprises a uniform resource locator (URL), wherein the first object store and the second object store are part of a federated namespace comprising a plurality of object stores;
determining, by the one or more processors, that the URL comprises a name of the federated namespace;
making, by the one or more processors, an application programming interface (API) request comprising a header including the name of the federated namespace to an objects server to access the first object store or the second object store;
determining, by the objects server, whether the API request is to access the first object store or the second object store; and
providing access, by the objects server, to the first object store responsive to determining that the API request is to perform the operation on the first object store or route the API request to the second object store to perform the operation on the second object store responsive to determining that the API request is to perform the operation on the second object store.

14. The method of claim 13, wherein the URL comprises a fully qualified domain name of the first object store or the second object store to be accessed and a name of the federated namespace.

15. The method of claim 13, further comprising determining, by the objects server, that the API request is to access the second object store responsive to identifying the name of the federated namespace in the header.

16. The method of claim 13, further comprising determining, by the objects server, that the API request is to access the first object store based on the API request not including a name of the federated namespace in the API request.

17. The method of claim 13, further comprising authenticate a user before making the API request.

18. The method of claim 13, wherein the objects server comprises an objects server for a local member associated with the first object store, and wherein routing the API request to the second object store comprises sensing, by the objects server for the local member, the API request to an objects server for a remote member associated with the second object store.

* * * * *